(12) United States Patent
Descharmes et al.

(10) Patent No.: US 12,540,899 B2
(45) Date of Patent: Feb. 3, 2026

(54) SURFACE-BASED LUMINESCENCE MEASUREMENT SUBSTRATE

(71) Applicant: ECOLE POLYTECHNIQUE FEDERALE DE LAUSANNE (EPFL), Lausanne (CH)

(72) Inventors: Nicolas Descharmes, Hauterive (CH); Raphaël Barbey, Lausanne (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 1019 days.

(21) Appl. No.: 17/437,396

(22) PCT Filed: Mar. 9, 2020

(86) PCT No.: PCT/IB2020/052019
§ 371 (c)(1),
(2) Date: Sep. 8, 2021

(87) PCT Pub. No.: WO2020/183341
PCT Pub. Date: Sep. 17, 2020

(65) Prior Publication Data
US 2022/0187208 A1 Jun. 16, 2022

(30) Foreign Application Priority Data
Mar. 8, 2019 (WO) .................. PCT/IB2019/051895

(51) Int. Cl.
*G01N 21/64* (2006.01)
(52) U.S. Cl.
CPC . *G01N 21/6454* (2013.01); *G01N 2021/6417* (2013.01); *G01N 2021/6469* (2013.01)

(58) Field of Classification Search
CPC ............... G01N 21/64; G01N 21/6428; G01N 21/6454; G01N 21/6486; G01N 2021/6417; G01N 2021/6469
(Continued)

(56) References Cited

U.S. PATENT DOCUMENTS

| 2002/0182716 A1 | 12/2002 | Weisbuch et al. |
| 2005/0051733 A1* | 3/2005 | Wiki .................. G01N 21/6452 250/453.11 |

(Continued)

FOREIGN PATENT DOCUMENTS

FR  2849922 A1  7/2004

OTHER PUBLICATIONS

Szmacinski et al. The Journal of Physical Chemistry C, vol. 116, Sep. 17, 2012, pp. 21563-21571.*
(Continued)

*Primary Examiner* — Maureen Wallenhorst
(74) *Attorney, Agent, or Firm* — Nixon & Vanderhye P.C.

(57) ABSTRACT

Surface-based measurement substrate including:
At least one optical cavity layer;
a first optical mirror and a second optical mirror, the first and second optical mirrors enclosing the optical cavity layer and defining an optical cavity, the first optical mirror and the second optical mirror are attached or fixed to the optical cavity layer to sandwich the optical cavity layer between the first and second mirrors; and
an interface layer or interface coating provided on the first mirror or the second mirror, the interface layer or coating being configured to receive or hold at least one entity including at least one electromagnetic radiation emitting marker.

17 Claims, 8 Drawing Sheets

(58) Field of Classification Search
USPC .......... 422/82.05, 82.08; 436/164, 165, 172; 250/458.1, 459.1, 462.1
See application file for complete search history.

(56) References Cited

U.S. PATENT DOCUMENTS

2010/0144052 A1* 6/2010 Pi .................... G01N 21/253
                                                422/82.11
2011/0269644 A1   11/2011 Fernandez
2017/0089835 A1*  3/2017 Bogner ............. G01N 21/645

OTHER PUBLICATIONS

International Search Report for PCT/IB2020/052019 dated Jun. 29, 2020, 3 pages.
Written Opinion of the ISA for PCT/IB2020/052019 dated Jun. 29, 2020, 10 pages.
Palestino et al, "Biosensing and Protein Fluorescence Enhancement by Functionalized Porous Silicon Devices", Langmuir, vol. 24, No. 23, Dec. 2, 2008, pp. 13765-13771, 7 pages.
Sciacca B et al., "Doubly Resonant Porous Silicon Microcavities for enhanced detection of Fluorescent Organic Molecules", Sensors and Acuators B: Chemical, Elsevier BV, NL, vol. 137, No. 2, Apr. 2, 2009, pp. 467-470, 4 pages.

* cited by examiner

SURFACE-BASED LUMINESCENCE MEASUREMENT SUBSTRATE

CROSS-REFERENCE TO RELATED APPLICATIONS

The present patent application is a United States national stage application of International patent application No. PCT/IB2020/052019 filed Mar. 9, 2020 designating the United States, and claims priority to international patent application number PCT/IB2019/051895 filed on Mar. 8, 2019, the entire contents thereof being herewith incorporated by reference.

FIELD OF THE INVENTION

The present invention concerns a measurement substrate or surface-based measurement substrate and in particular a luminescence measurement substrate, for example, a fluorescence, phosphorescence, photoluminescence, electroluminescence or chemiluminescence measurement substrate. The present invention also concerns a sample emission measurement method.

The present invention concerns a measurement substrate for detection, imaging or measurement of electromagnetic radiation or signals emitted by or from markers associated with objects included in a sample undergoing analysis, imaging or measurement.

BACKGROUND

Standard measurement supports such as glass slides, petri dishes, multiwell plates and flow chambers are known.

US2011/0269644 discloses a device for enhancing fluorescence detection comprising a support, a mirror and an enhancement layer whose thickness is such that a center of mass of fluorescing nano-objects placed thereon is located at an intensity maximum of an interference pattern produced when a stimulating light beam is reflected.

While such known substrates permit emission enhancement, this advantage is countered by the additional difficulties involved in assuring quality control of such fabricated substrates compared to standard measurement supports such as glass slides. The quality control of such fabricated substrates is constrictive, time-consuming and complex because the reflectance/transmittance of each fabricated structure must by strictly controlled to assure that the resulting material properties and material thicknesses of each fabricated structure correspond to those foreseen and that the stated enhancement is actually provided.

Discrepancies between the resulting material properties and material thicknesses and the targeted material properties and material thicknesses can result in no emission enhancement or, even worse, the suppression of emission should an emitter be located at an intensity minimum of an interference. Such discrepancies can also result in an enhancement that is inhomogeneous and differing across the substrate.

SUMMARY OF THE INVENTION

Certain example embodiments may provide a surface-based measurement substrate.

The measurement substrate of the present disclosure can, for example, be engineered taking into account particular configurations of optical readout systems intended for use with the substrate. The measurement substrate can be designed to provide a precise control of emission properties of luminescent species located on the surface of the measurement substrate.

It is possible to design measurement substrates that greatly improve the signal-to-noise of the luminescence measurement, or that dramatically cancel the emission of luminescence of species located on the surface, or that significantly increase or decrease the decay rate of a photobleaching species.

The measurement substrates of the present disclosure assure several important benefits that are of great importance for the successful design, production and marketing of viable commercial products.

For example, the measurement substrates are compatible with commercial readout systems. The enhancement provided by the measurement substrate is quantitative. The enhancement achieved can be independent of the choice of luminescent species.

The measurement substrates can advantageously be specific to the readout instrument rather than to the luminescent species. The measurement substrates can, for example, be supplied to the end user based on the specifications of a readout instrument, rather than based on the luminescent species used. This feature provides a key advantage of reducing the number of designs since there is a smaller number of standard filters than luminescent species. It greatly simplifies the manufacturing complexity linked to the small number of standard commercial readout instruments versus the enormous and continuously growing number of luminescent species.

It also provides a greater clarity in terms of enhancement value. The enhancement value can be tuned or adapted between 0 and a maximum value that is inherent to the optical readout configuration, by appropriately designing the measurement substrate.

On top of enabling greater performance, the approach leads to a greater clarity for the end user: one substrate design can be associated to one instrument or one specific set of parameters.

The luminescence measurement substrate permits to improve the performance of a luminescence measurement or analysis compared to the equivalent analysis when performed on a standard glass or polymer substrate.

The structure of the measurement substrate of the present disclosure, organised in a way that two mirrors and a cavity region are formed, present multiple major advantages over all the previous surface-based approaches, which are all based on a single mirror approach.

The presence of a cavity layer in between the two mirrors advantageously assures the generation of a photonic bandgap of larger width compared to an equivalent structure not having a cavity. This wide photonic bandgap translates into greater performance.

In particular, the measurement substrate of the present disclosure assures a quality control of the fabricated substrates that is significantly less constrictive, faster and less complex. The measurement substrate of the present disclosure assures the provision of one or several recognisable spectral feature(s) (reflectivity dip) introduced by the presence of the cavity enclosed by the two mirrors. This assures an efficient monitoring of structure quality after fabrication. The inventors found that the verified presence of this/these spectral feature(s) at (a) predetermined wavelength(s) and (a) reflectance/transmittance value(s) within a given tolerance range allows to confirm that the overall reflectance/transmittance profile of the measurement substrate corresponds to a targeted reflectance/transmittance profile of a designed structure assuring one of the previously mentioned emission enhancement advantages.

Advantageously, the measurement substrate of the present disclosure assures a spectrometer-free quality control method that is thus faster and simpler.

A deviation from the nominal position of the reflectivity dip can be advantageously assessed using a transmittance measurement rather than a full spectrum reflectance measurement.

Quality control can also be carried out by monitoring light intensity at one particular wavelength or within a significantly reduced wavelength range (for example, 10 nm) that can capture a spectral dip.

A selected fraction of the luminescence is allowed to propagate through the measurement substrate and enable a directional collection on the other side of the measurement substrate. This enables a great simplification of the optical train of the measurement apparatus and allows miniaturized measurement.

Optionally, simple tilting of the measurement structure can be carried out to obtain an angular intensity profile of the spectral feature (reflectivity dip) that will shift in wavelength as the measurement structure is tilted.

The measurement substrate of the present disclosure thus assures that a faster and simpler quality control system of the fabricated substrates can be used to assure quality control of measurement substrate.

Certain example embodiments may provide a method for carrying out a sample emission measurement.

Other advantageous features can be found in the dependent claims.

The above and other objects, features and advantages of the present invention and the manner of realizing them will become more apparent, and the invention itself will best be understood from a study of the following description with reference to the attached drawings showing some preferred embodiments of the invention.

A BRIEF DESCRIPTION OF THE SEVERAL VIEWS OF THE DRAWINGS

Herein, identical reference numerals are used, where possible, to designate identical elements that are common to the Figures.

DETAILED DESCRIPTION OF SEVERAL EMBODIMENTS

Figure 1:
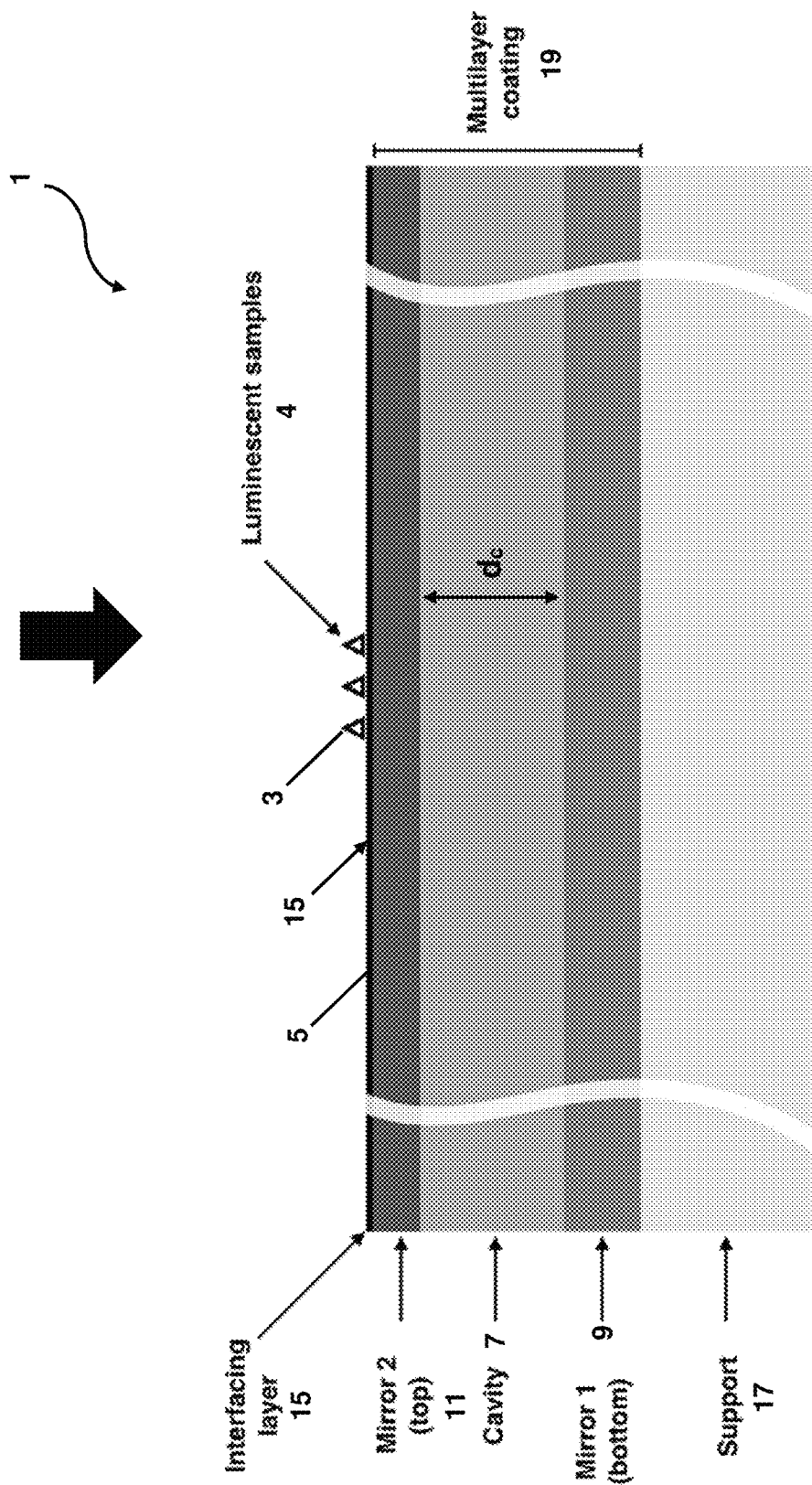
FIG. 1 is a schematic representation of an exemplary luminescence measurement substrate according to the present disclosure.

FIG. 1 schematically shows an exemplary luminescence measurement substrate 1 according to the present disclosure.

The luminescence measurement substrate 1 is, for example, a surfaced-based luminescence measurement substrate 1.

The measurement substrate 1 is configured to receive and/or hold electromagnetic radiation emitting markers or labels 3 or an entity 4 comprising electromagnetic radiation emitting markers 3 on an outer surface 5 of the measurement substrate 1.

The entity 4 may, for example, comprise or consist of a sample to be investigated, for example, a biological sample.

The electromagnetic radiation emitting markers or labels 3 permit measurement or detection of a targeted object or objects of the sample. The markers or labels (or dyes) 3 may be combined or conjugated with the object or objects, or the object may include an inherent or intrinsic marker or label 3 and directly emit electromagnetic radiation (auto-luminescent, for example, auto-fluorescent).

The objects to be detected may, for example, be chemical or biological objects such as chemical or biological material or molecules.

The entity 4 or object may, for example, consist solely of or comprise (at least one or a plurality of): a protein, or an oligonucleotide, or a base-pair, or DNA (or a DNA strand), or RNA (or a RNA strand), or an aminoacid, or an antibody, or a peptide, or a cell, or a bacterium, or a virus, or a (set of) tissue(s), or an array of the mentioned species.

The entity 4 can be located on top of the measurement substrate 1 and emission can emanate from the entity 4 (or the markers 3 therein) and from outside of the measurement substrate 1.

A large variety of detection and imaging applications involve luminescent species or markers 3 such as atoms, ions, molecules or quantum dots. Upon illumination, a luminescent specie or marker 3 absorbs part of the incoming, primary radiation and emits a secondary radiation. The secondary radiation often possesses different properties compared to the primary radiation such as frequency and/or polarization.

This difference allows for a selective filtering of the secondary radiation and, for example, a high contrast imaging of specimen or objects having regions of varying concentration in luminescent markers 3. This is typically the case of fluorescence imaging.

As previously mentioned, the luminescent function or property of the markers or labels 3 may be inherent or intrinsic to the object to be detected or imaged, or luminescent markers or labels 3 may be combined or conjugated with the object. The same principle is applied to detect the presence of species or objects of interest that have been attached or labelled with a luminescent label or marker 3. This is often the case in immunofluorescence methods, microarray-based analyses and DNA sequencing methods.

It is also possible to distinguish luminescent compounds based on the temporal and spectral characteristics of their emission. Fluorescence lifetime imaging is a direct illustration of this principle. Less directly, it is also possible to categorise Raman spectroscopy as an application of this principle. In this case, the specimen under investigation is also the luminescent material.

The electromagnetic radiation emitting marker or label 3 may thus comprise or consist solely of an inherent or intrinsic electromagnetic radiation emission mechanism of the object. Alternatively or additionally, the electromagnetic radiation emitting marker or label 3 may, for example, comprise or consist solely of at least one (or a plurality of) atom, ion, molecule, compound or quantum dot. The marker or label 3 can be directly or indirectly attached to a target object of interest in a sample under investigation.

For example, fluorescent molecules or compounds such as fluorophores or fluorochromes, for example, fluorescein, cyanine (or its derivatives), rhodamine (and its derivatives), Atto dyes or Alexa Fluor dyes can be directly or indirectly attached to a target object of interest in a sample under investigation.

The marker or markers 3 may, for example, consist solely of or comprise a luminescent probe or fluorescent marker.

The marker or markers 3 may, for example, consist solely of or comprise a fluorophore, a quantum dot, a naturally fluorescing element such as a protein (e.g. green fluorescent protein) or a (small) aromatic molecule or a (small) conjugated molecule.

The marker or label 3 is configured to emit electromagnetic radiation at a known or defined (peak) emission wavelength. A plurality of different markers or labels 3 may be used to attach to or identify a plurality of different objects in the sample under investigation. Each different marker or label 3 of the plurality of different markers or labels 3 is configured to emit electromagnetic radiation at a known or defined (peak) emission wavelength. This permits multiple different objects to be identified or determined.

The peak emission wavelength is, for example, in the visible wavelength range and/or the near IR wavelength range and/or in the near UV (190 to 400 nm). The peak emission wavelength is, for example, in the blue, green, yellow, orange red wavelength range and/or the near IR wavelength range and/or the near UV wavelength range.

The measurement substrate 1 according to the present disclosure (see, for example, FIG. 1) includes at least one or a plurality of optical cavity layers 7, a first optical mirror 9 and a second optical mirror 11.

The first and second optical mirrors 9, 11 contact (directly or indirectly) and enclose the optical cavity layer 7 and defining an optical cavity.

The first optical mirror 9 and the second optical mirror 11 are attached or fixed to the optical cavity layer 7 to sandwich the optical cavity layer 7 between the first and second mirrors 9, 11.

The optical cavity layer 7 may directly contact either or both of the first and second mirrors 9, 11.

The measurement substrate 1 also includes an interface layer or interface coating 15 provided on for example on an upper mirror. In the exemplary embodiment of FIG. 1, an interface layer or interface coating 15 is provided on the second or top mirror 11. The first mirror 9 defines a bottom mirror located below the second or top mirror 11.

The interface layer or coating 15 is configured to receive or hold the markers or labels 3, or an entity comprising at least one or a plurality of the markers or labels 3.

The interface layer or coating 15, for example, is configured to attach the entity 4 to the substrate and one or more markers 3 may then be included in the entity 4 if required.

The interface layer or coating 15 is external to the optical cavity. The interfacing layer 15 can be in direct or indirect contact with the top mirror 11.

The interface layer or interface coating 15 may, for example, consist solely of or comprise a hydrophobic coating, or a positively-charged coating, or an epoxy coating, or an aldehyde coating or a negatively-charged coating or a hydrogel coating, or a polymeric coating, or a cellulosic coating, or a streptavidin coating, or a neutravidin coating, or a biotin coating, or a thiol coating, or a N-hydroxysuccinimide (NHS) coating.

As previously mentioned, the entity may, for example, comprise or consist of a sample to be investigated comprising object or objects of interest that may, for example, be chemical or biological objects associated with electromagnetic radiation emitting markers 3.

The optical cavity layer 7 or the optical cavity is devoid of electromagnetic radiation emitting markers or labels 3. The optical cavity layer 7 or the optical cavity is an electromagnetic radiation emitting marker-free layer or marker-free cavity.

The optical cavity layer 7 comprises or consists of a solid substance. The optical cavity layer 7 is a solid state cavity layer. The optical cavity layer 7 or the optical cavity is impermeable to electromagnetic radiation emitting markers 3. The optical cavity layer 7 or the optical cavity defines a closed substance and markers or labels 3 cannot be inserted into the optical cavity layer 7 or the optical cavity of the measurement substrate 1. The measurement substrate 1 is configured to receive markers or labels 3 on the outer surface 5 of the measurement substrate 1 defined by the interface layer or coating 15.

The optical cavity layer 7 thickness and constituent material define an optical microcavity and the measurement substrate 1 includes an optical microcavity. The thickness of the cavity layer 7 is, for example, in the micrometre or nanometre range.

As mentioned, the measurement substrate 1 defines a surfaced-based luminescence measurement substrate 1.

The first and second mirrors 9, 11 may also, for example, be devoid of electromagnetic radiation emitting markers or labels 3.

The measurement substrate 1 may also include a support layer or support substrate 17. The first and second mirrors 9, 11 and the cavity layer 7 define a multilayer coating 19 located on the support layer 17. In the exemplary embodiment of FIG. 1, the bottom or first mirror 9 is in (direct) contact with the support layer 17. The cavity layer 7 is located above the bottom mirror 9 and the top mirror 11 is located above the cavity layer 7. The interfacing layer 15 is located above the top mirror 11.

The support substrate 17 may, for example, comprise or consist of glass, polymer, or a semiconductor.

The measurement substrate 1 may also include a tuning layer (non-illustrated) located between the interface layer or coating 15 and the top or second mirror 11. The thickness and/or material of tuning layer can be varied to tune a surface electric field located at the outer surface 5 of the measurement substrate 1 or at or in proximity of the location of the marker or markers 3. This permits to set or determine a surface electric field that enhances emission of the markers 3.

The measurement substrate 1 defines a vertical cavity device or structure in which the optical cavity or resonator is defined in a vertical direction or between the top and bottom of the structure, where the vertical direction is defined by the direction of layer superposition of the layers of the measurement substrate 1.

The measurement substrate 1 defines a vertically extending planar structure comprising a plurality of superposed planar layers. The first optical mirror 9, the second optical mirror 11 and the optical cavity layer 7 define a vertical optical cavity structure.

Figure 5:
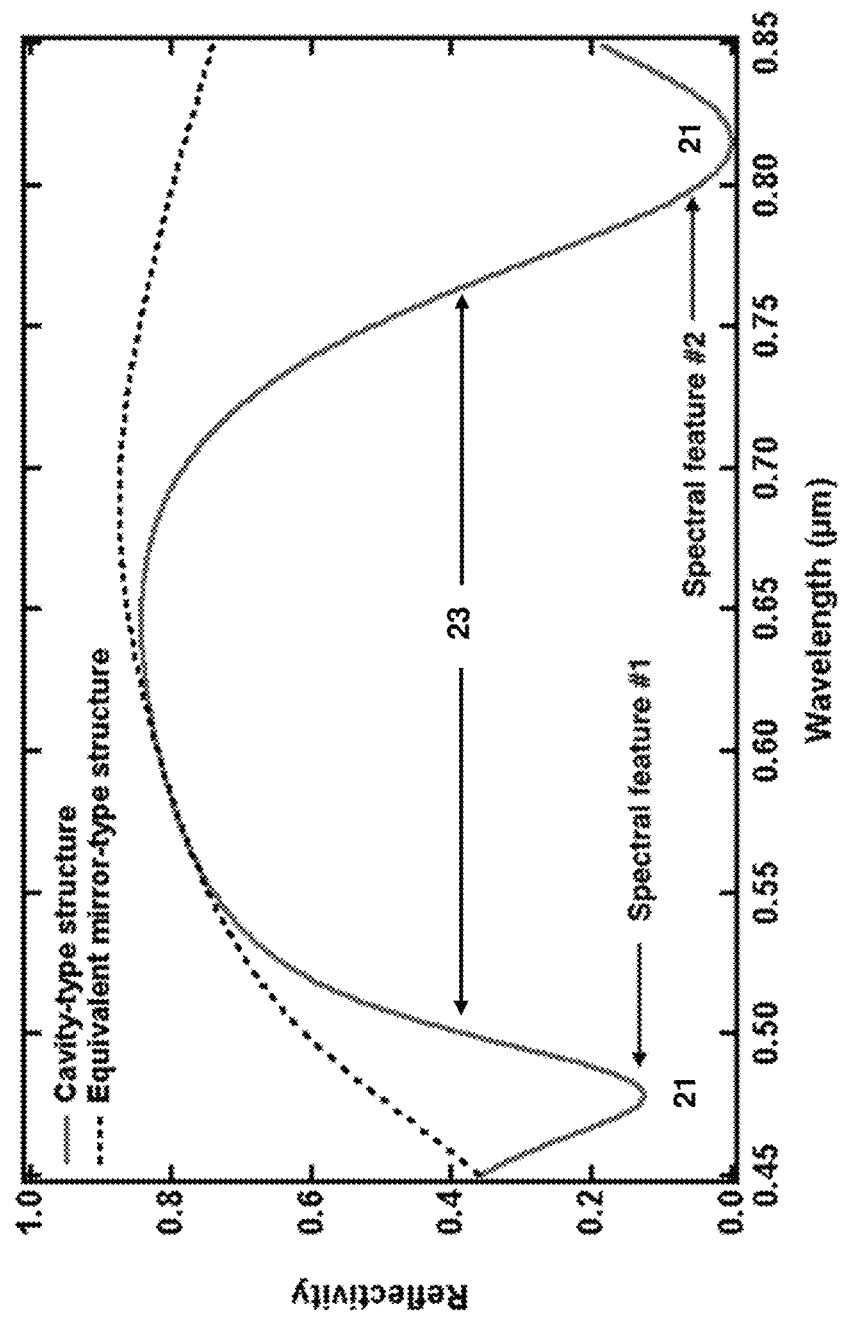
FIG. 5 shows a reflectance spectrum of a luminescence measurement substrate according to the present disclosure comprising spectral features and in particular spectral characteristics that are a reflectivity resonance dips introduced by the presence of the cavity of the luminescence measurement substrate enclosed or formed by the two mirrors.

Advantageously, the optical cavity layer 7 delimits a layer thickness $d_c$ (in the vertical direction) defining at least one or a plurality of spectral features or spectral dips 21 in reflectance from the measurement substrate 1 (see, for example, FIG. 5). For example, one, two, or three spectral features may be present.

The reflectance is measured (for example at 0° incident angle) from the top of the measurement substrate 1 or the interfacing layer 15 face or side of the measurement substrate 1 where markers or labels 3 are destined to be or are located (indicated by the upper arrow in FIG. 1). The reflectance is measured in the vertical direction. The reflectance may alternatively be measured (for example at 0° incident angle) from the bottom of the measurement substrate 1 or the support face or side of the measurement substrate 1.

The layer thickness value $d_c$ of the optical cavity layer 7 to locate the spectral feature(s) at (a) targeted wavelength(s) or within a wavelength range will of course be determined by the material of the cavity layer 7 and the refractive index of that material.

The spectral feature(s) or spectral dip(s) 21 is/are generated or defined by the optical cavity and the optical cavity layer 7. The spectral feature(s) or spectral dip(s) 21 is/are present in a wavelength range of the reflectance from the measurement substrate 1. The spectral feature or spectral dip 21 defines a U-shaped feature or a feature whose reflectance value firstly decreases to a minimum or lowest value before then increasing in value as a function of wavelength.

The spectral feature 21 is associated with or corresponds to a resonance of the optical cavity of the measurement substrate 1. The spectral feature is, for example, a cavity resonance spectral feature or dip.

The optical cavity layer 7 may delimit a layer thickness $d_c$ defining at least two such spectral features 21 simultaneously generated in the reflectance wavelength profile with at least one or only one reflectance band 23 defined between the at least two such spectral features 21. The reflectance band 23 defines an inverted U-shaped reflectance profile or one that, between the at least two such spectral features 21, increases as a function of wavelength, increases at a smaller rate, decreases and then decreases at a faster rate.

The mirrors 9, 11 and the optical cavity layer 7 are configured to define a reflectance band 23 whose full-width half maximum FWHM reflectance wavelength range includes at least one emission wavelength of the electromagnetic radiation emitting markers 3, or a plurality (at least two) of emission wavelengths of different electromagnetic radiation emitting markers 3.

The at least one spectral feature 21 is preferably offset in wavelength from an (peak) emission wavelength of the electromagnetic radiation emitting marker or markers 3 destined to be used or being used with the measurement substrate 1.

The at least one spectral feature 21 is preferably offset in wavelength from the excitation wavelength of the marker or markers 3.

The at least one spectral feature 21 is preferably offset in wavelength by at least 10 nm, or at least 20 nm, or at least 30 nm or at least 40 nm or at least 50 nm from an (peak) emission wavelength of the electromagnetic radiation emitting marker or markers 3. This advantageously assures that emitted light from the markers 3 is strongly reflected by the measurement substrate 1.

The optical cavity layer 7 delimits a layer thickness $d_c$ defining at least one or a plurality of spectral feature or spectral dip 21 in reflectance from the measurement substrate 1 at a wavelength or wavelengths within the range ≤1500 nm and ≥190 nm, or ≤900 nm and ≥190 nm.

The optical cavity layer 7 delimits a layer thickness $d_c$ defining at least one spectral feature or spectral dip 21 in reflectance from the measurement substrate 1 at wavelength ≤1500 nm and ≥190 nm, or ≤900 nm and ≥190 nm, or ≤850 nm and ≥250 nm, or ≤850 nm and ≥400 nm, or ≤700 nm and ≥350 nm, or ≤600 nm and ≥400 nm, or ≤650 nm and ≥500 nm, or ≤700 nm and ≥550 nm.

The optical cavity layer 7 delimits a layer thickness $d_c$ defining a first spectral feature or spectral dip 21 in reflectance from the measurement substrate 1 at wavelength ≤850 nm and ≥250 nm, or ≤850 nm and ≥400 nm, or ≤700 nm and ≥350 nm, or ≤600 nm and ≥400 nm, or ≤650 nm and ≥500 nm, or ≤700 nm and ≥550 nm; and a second spectral feature or spectral dip 21 separated from the first spectral feature or spectral dip 21 by between 50 nm and 400 nm, or between 300 nm and 400 nm, or between 200 nm and 300 nm, or between 100 nm and 200 nm, or between 50 nm and 100 nm. The second spectral feature is for example at a longer wavelength.

The reflectance being measured at 0° incident angle of the measuring light or a 5° incident angle or a 10° incident angle or a 15° incident angle.

The spectral feature or spectral dip 21 (or the plurality of spectral features) is a cavity resonance or generated by a cavity resonance.

Moreover, the presence of the at least one spectral feature 21 assures a faster and simpler quality control of the fabricated measurement substrates 1 as previously mentioned above.

The optical cavity layer 7 may, for example, comprise or consist solely of a material or materials having an emission profile that is non-emitting or only weakly emitting at the emission wavelength peak or line of the electromagnetic radiation emitting marker or markers 3.

Additionally or alternatively, the optical cavity layer 7 may, for example, comprise or consist solely of a material or materials having an emission profile that is non-emitting or only weakly emitting at the cavity resonance wavelength of the measurement substrate 1.

The optical cavity layer 7 or the optical cavity can be, for example, a luminescent material-free layer or cavity; or a quantum well-free layer or cavity; or a quantum dot-free layer or cavity.

The measurement substrate 1 may, for example, include the electromagnetic radiation emitting marker or markers 3, or may include the entity 4 or sample comprising the electromagnetic radiation emitting marker or markers 3. Emission emanates from the entity 4 and emanates outside of the at least one optical cavity layer 7.

Figure 2:
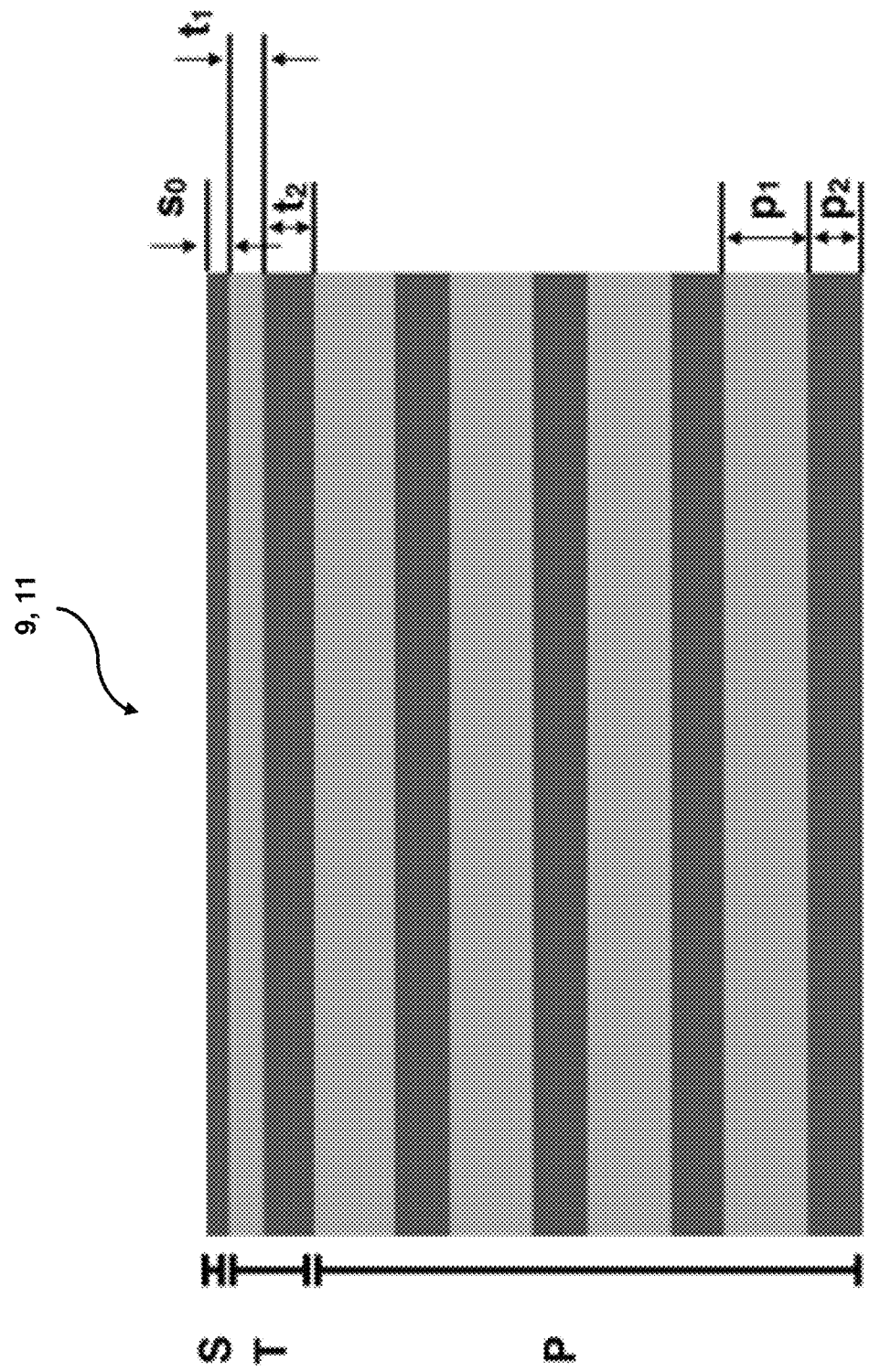
FIG. 2 is a schematic representation of an exemplary mirror design of a luminescence measurement substrate according to the present disclosure, the mirror having an exemplary PTS architecture.
Figure 3:
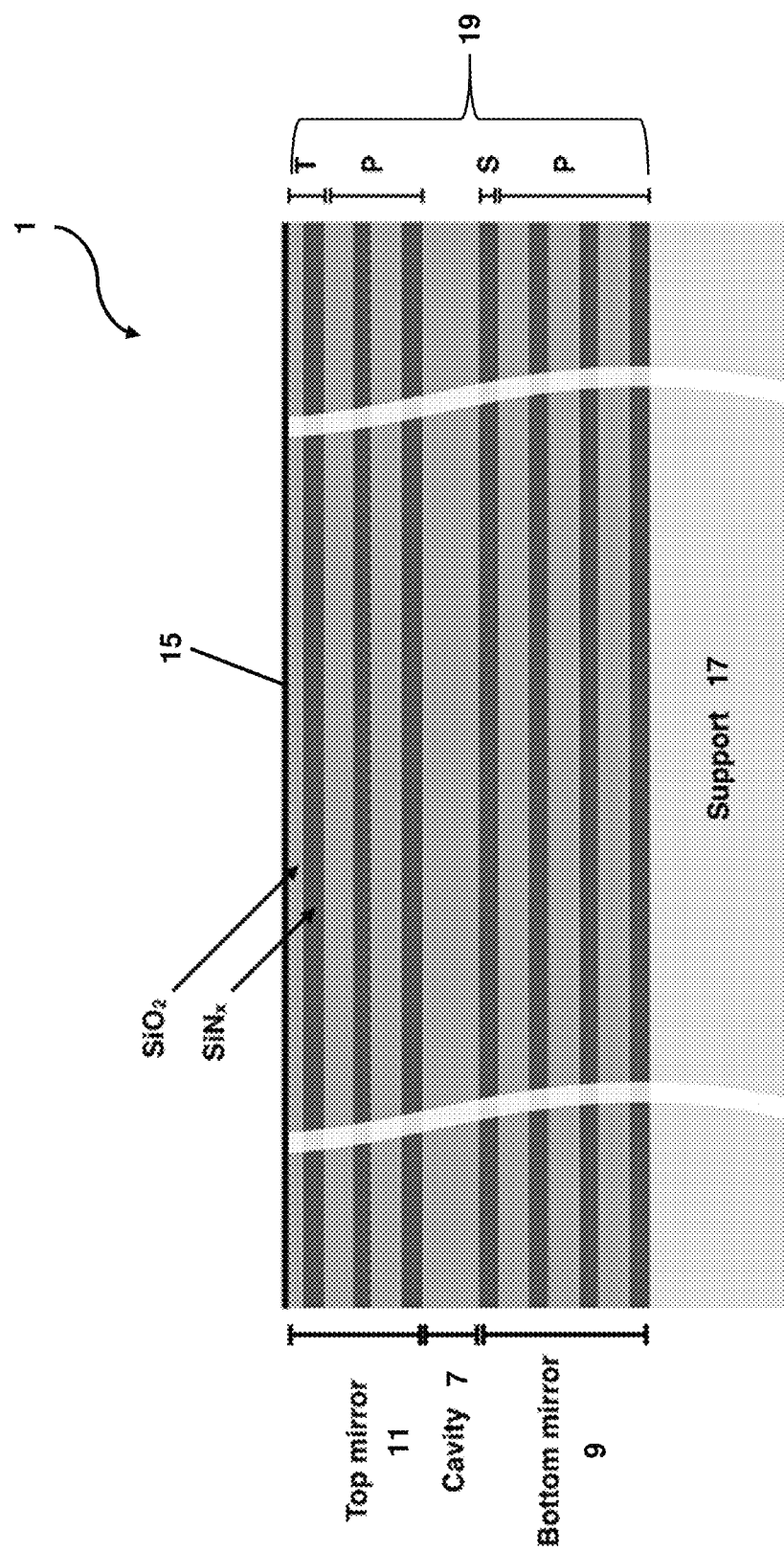
FIG. 3 is a schematic representation of the exemplary structure of a luminescence measurement substrate according to the present disclosure set out in Table 1.
Figure 4:
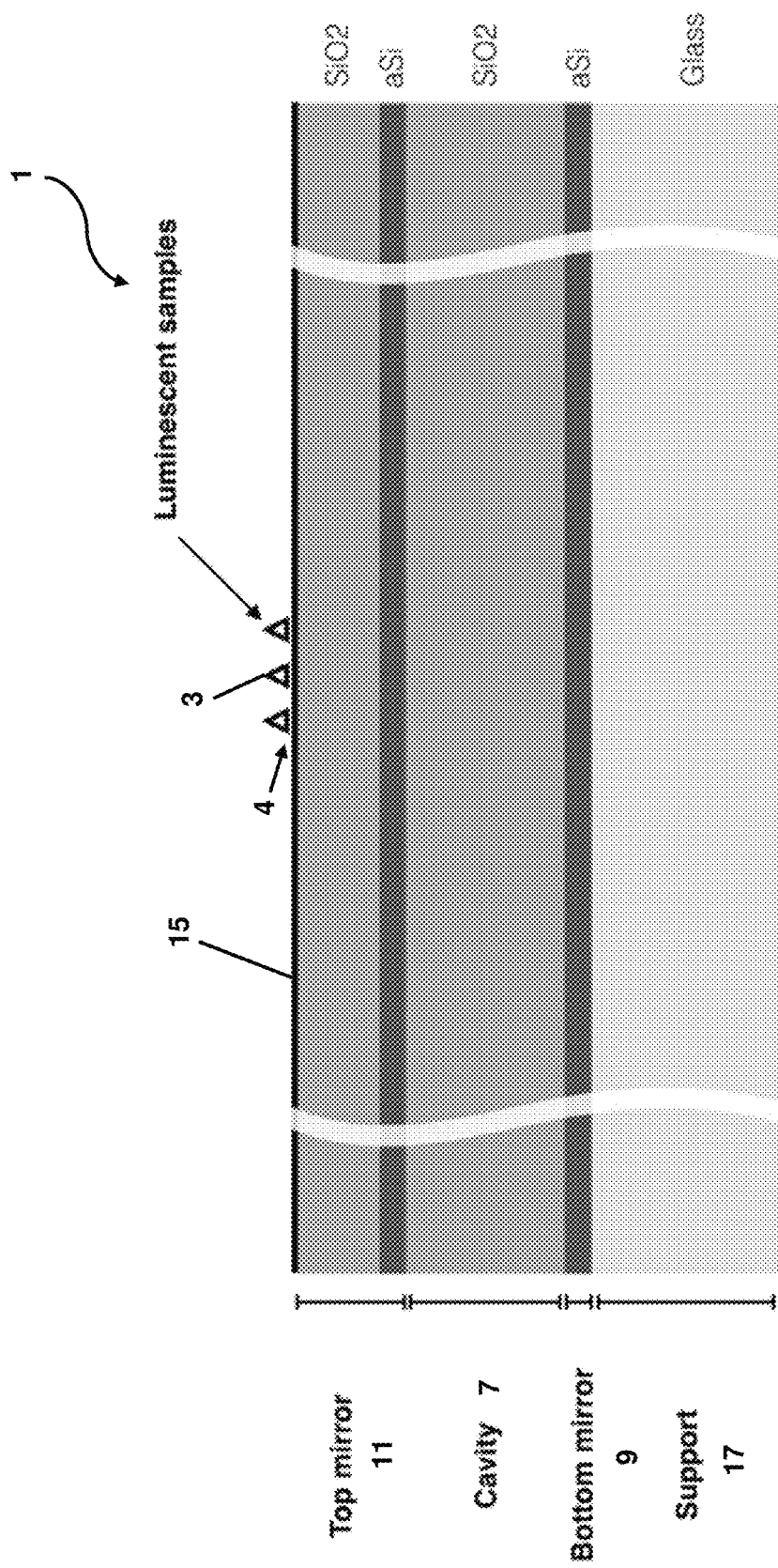
FIG. 4 is a schematic representation of an exemplary luminescence measurement substrate according to the present disclosure.

The first optical mirror 9 and/or the second optical mirror 11 may, for example, comprise or consist solely of a single layer S, a stack of two layers T or a periodic stack of multiple layers P (see, for example, FIGS. 2 to 4). The layers may, for example, comprise or consist of a dielectric, insulating or metallic material.

The first optical mirror 9 and/or the second optical mirror 11 may, for example, comprise or consist solely of any combination of the following: a single layer S, a stack of two layers T or a periodic stack of multiple layers P.

The first optical mirror 9 and/or the second optical mirror 11 may, for example, comprise or consist solely of:
  (i) a single layer of a material displaying a large refractive index contrast with a neighbouring layer material or a thin metallic layer; or
  (ii) a set of two layers (two-layer stack) of two distinct materials having two distinct refractive indices and whose thicknesses are chosen so as to verify a pre-defined or appropriate phase relationship; or
  (iii) a periodic repetition of a two-layer stack; or
  (iv) any combination of the above.

The first and the second optical mirrors 9, 11 may, for example, have the same or a different central design wavelength.

The optical cavity layer 7 has a thickness and refractive index value defining a resonance at a cavity resonance wavelength $\lambda_c$ and the resonance can, for example, be detuned or non-detuned relative to a central design wavelength of the first and/or the second optical mirrors 9, 11.

A thickness of the optical cavity layer 7 is, for example, greater than or less than a thickness of any one of the constituent layer or layers of the first and/or second mirrors 9, 11.

The measurement substrate 1 may, for example, comprise or consist solely of an arrangement of alternating layers having a central design wavelength outside of a reflection band or reflection stop-band wavelength range of the first and/or second mirrors 9,11.

The luminescence measurement substrate 1 can be used for the observation or measurement of samples 4 consisting of, or containing, luminescent probes such as fluorophores 3. The sample or samples 4 to be measured are positioned on top of the luminescence measurement substrate 1 and a signal of interest can then be recorded with an apparatus such as a microscope, an automated microscope, an optical scanner, a multiplate reader, or a DNA sequencer.

The luminescence measurement substrate 1 can be a replacement, or an add-on, for standard measurement supports such as glass slides, petri dishes, multiwell plates and flow chambers. The luminescence measurement substrate 1 can be configured to provide enhanced measurement conditions compared to these standard supports. The performance enhancement can be provided in multiple forms, for example, as an increase of the signal-to-noise ratio, as a suppression of a specific background, or as an increase of the lifetime of the luminescent species.

As mentioned, the luminescence measurement substrate 1 may comprise or consist of, for example, the following three main components (see FIG. 1):
  a support 17, for example, typically a piece of glass, polymer, or semiconductor.
  a multilayer coating or structure 19 that is deposited or grown on top of the support 17. The multilayer coating 19 has for example a number of layers that is greater than, or equal to, three. The multilayer 19 is, for example, designed such that it forms three distinct regions with specific properties and effect: the first mirror (bottom mirror) 9, the cavity and the second mirror (top mirror) 11.
  an interfacing coating 15 that is deposited or grown on top of the multilayer coating or structure 19. Hydrophobic coatings, positively-charged coatings, epoxy coatings are some of many non-limiting examples of an interfacing coating 15. Other examples include one or more of an aldehyde coating, a negatively-charged coating, a hydrogel coating, a polymeric coating, a cellulosic coating, a streptavidin coating, a neutravidin coating, a biotin coating, a thiol coating, a N-hydroxysuccinimide (NHS) coating.

The support 17 and interfacing coating 15 allow, for example, to have a more functional and usable device. An important aspect resides in the structure of the multilayer coating 19. The luminescence measurement substrate 1 preferably (i) provides a significant and quantitative improvement of performances compared to a standard substrate, (ii) can be produced in a repeatable manner and be compatible with a quick and simple quality control process, (iii) can be produced at a competitive cost.

The exemplary multilayer coatings 19 described herein in the following paragraphs and the mirror architecture comprising or consisting of one or more of a single layer S, a stack of two layers T and a periodic stack P advantageously assure these three advantages simultaneously.

The sample or samples 4 positioned on top of a luminescence measurement substrate 1 can be of variety of nature and composition. It may consist of or comprise a thin slice of material such as a biological tissue obtained, for example, after adequate fixation and microtomy steps. The slice can be of a variety of thickness such as 100 nm, 1 µm, 5 µm or 10 µm. It can consist of or comprise living cells or microorganisms. It can consist of or comprise a mixture of wet or dried biological or physiological species such as a cell extract, or plain or filtered bodily fluids. It can consist of or comprise molecular species such as proteins, antibodies, DNA, RNA, or aminoacids.

The luminescent characteristic of the sample 4 can be intrinsic, through the natural presence of radiation emitting compounds defining an intrinsic marker or label 3 in the sample 4. It can also be extrinsic and assured by an extrinsic marker or label 3 in the sample 4, through for example the anterior or posterior addition of radiation emitting compounds or species such as a type of fluorescent probes, a set of types of fluorescent probes that have separated or combined optical responses; a type of quantum dots or a set of types of quantum dots, a chemical compound that emits an electromagnetic radiation when in the presence of another chemical species.

In the case of a sample 4 or a set of samples 4 where the radiation emitting property is obtained by extrinsic markers or labels 3 and the extrinsic addition of a radiation emitting compound, prior or after the positioning of the sample 4 on top of the luminescence measurement substrate 1, the addition of the radiation emitting property may in some cases be mediated by the intermediate addition of one or several molecular species. A so-called "sandwich immunoassay" is one example where molecular objects are positioned on a surface appropriately covered with a primary antibody and where secondary antibodies position themselves on the molecular objects. The secondary antibody is usually used as a vector for a radiation emitting compound or an enzyme.

Another example makes use of a primary antibody that does not contain any fluorescent moieties to target a specific marker that is positioned on the surface. A second antibody, that is linked to a luminescent dye, specifically position itself on the primary antibody.

In another example, a molecule of interest is targeted with a primary, biotinylated antibody. A radiation emitting compound is then added, for example, using labelled-streptavidin.

The multilayer coating 19 comprises or consists of, for example, a sequence of layers made of materials having alternatively a high and a low refractive index. The materials used may be fully transparent or do not display strong absorption lines in the spectral region where the luminescence measurement substrate 1 is destined to operate.

The materials used for the multilayer coating 19 may be chosen amongst the large choice of materials compatible with thin film deposition or growth techniques. This includes for example: (i) oxide compounds such as silicon oxide, titanium oxide, aluminium oxide, tantalum pentoxide, zinc oxide, hafnium oxide, or (ii) nitride compounds such as silicon nitride, aluminium nitride, gallium nitride, or (iii) fluoride compounds such as magnesium fluoride, calcium fluoride, or (iv) chalcogenide compounds such as zinc selenide and zinc sulphide, or (v) intrinsic semiconductors such as silicon and germanium, or (iv) metals such as gold, silver or aluminium. This list is non-exhaustive and is not restricted to the exact stoichiometry of the compounds listed. Mixtures of the above families of compounds, for example oxynitrides materials, can also be utilized for the realisation of the luminescence measurement substrate 1.

The materials can be deposited or grown using a variety of methods such as: (i) chemical vapor deposition techniques (CVD) for example plasma-enhanced chemical vapor deposition (PECVD), or (ii) evaporation techniques such as thermal evaporation, electron-beam evaporation, ion assisted evaporation, or (iii) sputtering techniques such as magnetron sputtering, ion-beam assisted sputtering, or (iv) molecular beam epitaxy.

The structure of the multilayer coating 19, may for example, comprise or consist of the following 3 parts (as shown for example in FIGS. 1, 3 and 4):
- a first mirror (bottom mirror) 9
- a cavity layer 7
- a second mirror (top mirror) 11

The mirrors 9, 11 are numbered with respect to their order of growth or deposition onto the support 17. The performance of the luminescence measurement substrate 1 is defined by the design of the multilayer coating 19. Different designs can be produced by defining a set of structural parameters described in the following paragraphs.

The bottom and top mirrors 9, 11 comprise or consist of an arrangement of one or several layers of the materials listed or described previously. A variety of configurations are possible for the realisation of the mirror 9, 11 such as the use of: (i) a single layer of a material displaying a large refractive index contrast with the neighbouring materials (e.g. silicon) or a thin metallic layer; (ii) a set of two layers (two-layer stack) of two distinct materials having two distinct refractive indices and whose thicknesses are chosen so as to satisfy an appropriate or predetermined phase relationship; (iii) a periodic repetition of a two-layer stack; (iv) a combination of the above (i), (ii) or (iii).

Concerning the general structure and types of mirrors, in the most general case, the mirror 9, 11 is constituted of or comprises at least one of or a combination of one or more of the following: a single layer S, a stack of two layers T and a periodic stack P.

Based on this description, a large variety of mirror architectures for the top and/or bottom mirrors 9, 11 are thus possible, for example, S, P, T, SP, PS, STP, PST, etc. with some being more practically relevant than others.

Here again, the naming of an architecture is chosen in the order of layer growth or deposition. In that sense, a PTS mirror corresponds to a mirror consisting of, first a periodic stack (at the bottom), then a pair of layers and finally a single layer.

Each configuration (S, T, P) is characterized by a set of parameters: the choice of material(s) used, the thickness of each layer: $s_0$ for the S configuration, $t_1$ and $t_2$ for the T configuration, $p_1$ and $p_2$ for the P configuration.

The P-configuration is also characterized by the number of repetitions of the periodic stack N. For the sake of scalability of the design, it is useful to express the thickness parameters ($s_0$, $t_1$, $t_2$, ...) in units of a quarter of the design wavelength $\lambda_M$ of the mirror $$\left(\frac{\lambda_M}{4}\right).$$

FIG. 2 shows an exemplary mirror with a PTS architecture illustrating the design parameters.

Concerning the phase relationship, it is sometimes advantageous to use a periodic arrangement of layers of two distinct materials and form a so-called Distributed Bragg Reflector (DBR). This type of arrangement allows to achieve greater reflectivity values than achievable with metallic coatings (typically 90-95% maximum).

In the specific case of an arrangement of two materials labelled material 1 and material 2 having refractive indices $n_1$ and $n_2$, the periodic arrangement is constituted of a repetition of a pattern of two layers. The thickness of each layer $d_1$ (material 1) and $d_2$ (material 2) verifies the following phase relationship:

$$n_1 \cdot d_1 + n_2 \cdot d_2 = \frac{\lambda_M}{2}$$

where $\lambda_M$ is the central design wavelength of the mirror. The most common approach to this design constraint is to choose $d_1$ and $d_2$ such that:

$$n_1 \cdot d_1 = n_2 \cdot d_2 = \frac{\lambda_M}{4}$$

Alternatively, the phase relationship can be written as:

$$\frac{1}{2(1-K)} \cdot n_1 \cdot d_1 + \frac{1}{2K} \cdot n_2 \cdot d_2 = \frac{\lambda_M}{2}$$

where K is a weighting parameter analogous to a duty cycle in electronics that verifies: 0<K<1. This approach leads to different set of values for $d_1$ and $d_2$. The peak reflectivity of the mirrors is controlled by selecting the materials used and the number of lattice periods N constituting the mirror where N is a positive integer (N≥1).

A stack of two layers T-configuration can thus be formed by choosing $t_1=d_1$ and $t_2=d_2$. Respectively, a periodic stack P-configuration can be formed by choosing $p_1=d_1$ and $p_2=d_2$.

It should be noted that the bottom (M1) and top (M2) mirrors 9, 11 are not necessarily designed using the same central design wavelength ($\lambda_{M1} \neq \lambda_{M2}$). The first and the second optical mirrors 9, 11 may, for example, thus have the same ($\lambda_{M1}=\lambda_{M2}$) or a different central design wavelength ($\lambda_{M1} \neq \lambda_{M2}$).

The cavity layer 7 may comprise or consist of one or several layers chosen, for example, among the afore-mentioned materials and whose thickness $d_c$ can be chosen to satisfy a constructive phase relationship and hence provide a resonance or spectral feature 21. In the simplest case, a cavity can be formed by introducing a single layer whose thickness $d_c$ satisfies the following relationship:

$$n_C \cdot d_C = C \cdot \frac{\lambda_C}{2}$$

Here $n_C$ is the refractive index of the cavity layer material, $d_C$ is the cavity layer thickness, $\lambda_C$ is the central design wavelength of the cavity and C is a positive integer (C≥1). $\lambda_C$ can be chosen such that:

$$\lambda_C = \lambda_{M1} = \lambda_{M2}$$

Alternatively, $\lambda_C$ can be detuned compared to $\lambda_{M1}$ and/or $\lambda_{M2}$ (by, for example, detuned between 1 and 3 nm, or between 1 and 5 nm, or between 1 and 10 nm or between 10 and 50 nm, or detuned by >50 nm or >100 nm) in order to tailor the reflectivity spectrum and/or response surface electric field of the measurement substrate 1.

It is convenient in terms of fabrication time, cost and reliability to use cavity layers 7 having a reduced thickness $d_C$. Choosing C=1 or C=2 provides some design flexibility while minimizing the cavity layer thickness $d_C$. Still, it should be noted that in a vast majority of cases, the thickness of the cavity layer 7 is greater than the thickness of any other layer of the multilayer coating 19.

Alternatively, it is possible to form a cavity by introducing an arrangement of alternating layers similar to that of a Distributed Bragg reflector, having a central design wavelength chosen outside of the reflection band of the top and bottom mirrors 9,11.

Once the material or materials of the cavity layer 7 is chosen, the optical cavity layer thickness $d_c$ can be chosen to provide the spectral feature or features 21 in reflectance from the measurement substrate 1 (see, for example, FIG. 5) as well as the reflectance band 23. The spectral feature or features 21 is associated with or correspond to a resonance of the optical cavity.

An important distinction should be made between the structure of the measurement substrate 1 described herein and standard structures for solid state light emission having an optical cavity. In the case of the structure of the measurement substrate 1 of the present disclosure, the luminescent objects are for example located on the top of the device and light emission by the markers 3 occurs outside of the multilayer structure and outside the multilayer coating 19.

The optical layer 7 or the optical cavity is, for example, an active laser medium-free layer or an active laser medium-free cavity, or a light emitting diode active medium-free layer or an active light emitting diode medium-free cavity, or a quantum structure active medium-free layer or a quantum structure active medium-free cavity, or an electrical or optical pumping-free layer or an electrical or optical pumping-free cavity.

The cavity can include or consist of a material that is absorbing (an absorption coefficient α, where 1000000 cm$^{-1}$≥α≥0 cm$^{-1}$, or 700000 cm$^{-1}$≥α≥0 cm$^{-1}$, or 500000 cm$^{-1}$≥α≥0 cm$^{-1}$, or 100000 cm$^{-1}$≥α≥0 cm$^{-1}$) or alternatively a material, non-absorbing at or near (within at least 3 nm or 5 nm or 10 nm or 15 nm or 25 nm or 30 nm or 40 nm or 50 nm or 60 nm or 75 nm or 100 nm thereof) the wavelength of emission of the luminescent object or marker or markers 3, and/or the cavity resonance wavelength. In particular, the material for example does not display any absorption line such as an electronic transition in the vicinity of the wavelength of interest.

In the case of standard structures for solid state light emission having an optical cavity, the light emitters (e.g. a luminescent material, a quantum well, quantum dots) are located inside and in between the two mirrors, inside the cavity region. The light emission process occurs within the structure and is typically enhanced by the feedback provided by the cavity effect. In contrast, the measurement substrate 1 of the present disclosure is a non-cavity light emission device.

The optical cavity layer 7 may comprise or consist solely of a material or materials having an emission profile that is non-emitting at the emission wavelength peak or line of the electromagnetic radiation emitting marker or markers 3 and/or at the cavity resonance wavelength as defined in the reflectance of the measurement substrate 1.

The optical cavity layer 7 may comprise or consist solely of a material or materials having an emission profile that is non-emitting within a FWHM wavelength range of the emission wavelength profile of the electromagnetic radiation emitting marker or markers 3 and/or non-emitting within a FWHM wavelength range of the cavity resonance 21.

The optical cavity layer 7 may comprise or consist solely of a material or materials having an emission peak wavelength that is:
(i) different to the emission wavelength peak or line of the electromagnetic radiation emitting marker or markers 3 and/or different to the cavity resonance central wavelength; and/or
(ii) separated from the emission wavelength peak or line of the electromagnetic radiation emitting marker or markers 3 by at least 1, or 2, or 5, or 10, or 15, or 20, or 25, or 30, or 35, or 40, or 45, or 50, or 60 or 70 or 80 nm or 90 or 100 nm; and/or separated from the cavity resonance central wavelength by at least 1, or 2, or 5, or 10, or 15, or 20, or 25, or 30, or 35, or 40, or 45, or 50, or 60 or 70 or 80 nm or 90 or 100 nm.

The optical cavity layer 7 may comprise or consist solely of a material or materials having an emission wavelength range that is non-overlapping with an emission wavelength range of the electromagnetic radiation emitting marker or markers 3 and/or is non-overlapping with a wavelength range or a FWHM wavelength range of the cavity resonance wavelength.

The optical cavity layer 7 may comprise or consist solely of a material or materials having an emission FWHM wavelength range that is non-overlapping with an emission FWHM wavelength range of the electromagnetic radiation emitting marker or markers 3 and/or is non-overlapping with a FWHM wavelength range of the cavity resonance wavelength.

The optical mirrors 9, 11 may comprise or consist solely of a material or materials having an emission peak wavelength that is:
(i) different to the emission wavelength peak or line of the at least one electromagnetic radiation emitting marker or markers 3 and/or different to the cavity resonance central wavelength; and/or
(ii) separated from the emission wavelength peak or line of the at least one electromagnetic radiation emitting marker or markers 3 by at least 1, or 2, or 5, or 10, or 15, or 20, or 25, or 30, or 35, or 40, or 45, or 50, or 60 or 70 or 80 nm or 90 or 100 nm; and/or separated from the cavity resonance central wavelength by at least 1, or 2, or 5, or 10, or 15, or 20, or 25, or 30, or 35, or 40, or 45, or 50, or 60 or 70 or 80 nm or 90 or 100 nm.

The optical mirrors 9, 11 may comprise or consist solely of a material or materials having an emission wavelength range that is non-overlapping with an emission wavelength range of the electromagnetic radiation emitting marker or markers 3 and/or is non-overlapping with a wavelength range or a FWHM wavelength range of the cavity resonance wavelength.

The optical mirrors 9, 11 may comprise or consist solely of a material or materials having an emission FWHM wavelength range that is non-overlapping with an emission FWHM wavelength range of the electromagnetic radiation emitting marker or markers 3 and/or is non-overlapping with a FWHM wavelength range of the cavity resonance wavelength.

Table 1 below presents exemplary design parameters of an exemplary structure of a measurement substrate 1 of the present disclosure. FIG. 3 is a schematic of the exemplary structure described in Table 1.

TABLE 1

Exemplary design parameters of an exemplary structure of a measurement substrate

| | | | Symbol | Example value |
|---|---|---|---|---|
| Top mirror (M2) | T | | | PT |
| | | | Design architecture | |
| | | | Design wavelength $\lambda_{M2}$ | 633 nm |
| | | 1 | T-layer material 1 | SiO$_2$ |
| | | | Material 1 refractive index $n_1$ | 1.46 (at 633 nm) |
| | | | T-layer phase 1 $n_1 \cdot t_1$ | $0.5 \left(\text{unit of } \frac{\lambda_M}{4}\right)$ |
| | | | T-layer thickness 1 $t_1$ | 54 nm |
| | | 2 | T-layer material 2 | SiN$_x$ |
| | | | Material 2 refractive index $n_2$ | 1.98 (at 633 nm) |
| | | | T-layer phase 2 $n_2 \cdot t_2$ | $1 \left(\text{unit of } \frac{\lambda_M}{4}\right)$ |
| | | | T-layer thickness 2 $t_2$ | 80 nm |
| | P | 1 | P-layer material 1 | SiO$_2$ |
| | | | Material 1 refractive index $n_1$ | 1.46 (at 633 nm) |
| | | | P-layer phase 1 $n_1 \cdot p_1$ | $1 \left(\text{unit of } \frac{\lambda_M}{4}\right)$ |
| | | | P-layer thickness 1 $p_1$ | 108 nm |
| | | 2 | P-layer material 2 | SiN$_x$ |
| | | | Material 2 refractive index $n_2$ | 1.98 (at 633 nm) |
| | | | P-layer phase 2 $n_2 \cdot p_2$ | $1 \left(\text{unit of } \frac{\lambda_M}{4}\right)$ |
| | | | P-layer thickness 2 $p_2$ | 80 nm |
| | | | Number of period repetitions N | 2 |
| Cavity | C | | Design wavelength $\lambda_C = \lambda_M$ | 633 nm |
| | | | Cavity layer material | SiO$_2$ |
| | | | Cavity material refractive index $n_C$ | 1.46 (at 633 nm) |
| | | | Cavity parameter C | 1 |
| | | | Cavity layer phase $n_C \cdot d_C$ | $2 \left(\text{unit of } \frac{\lambda_C}{4}\right)$ |
| | | | Cavity layer thickness $d_C$ | 216 nm |

TABLE 1-continued

Exemplary design parameters of an exemplary structure of a measurement substrate

| | | | Symbol | Example value |
|---|---|---|---|---|
| Bottom mirror (M1) | S | | Design architecture | PS |
| | | | Design wavelength $\lambda_{M1}$ | 633 nm |
| | | | S-layer material | SiN$_x$ |
| | | | Material refractive index $n_S$ | 1.98 (at 633 nm) |
| | | | S-layer phase $n_S \cdot s_0$ | $1 \left(\text{unit of } \frac{\lambda_M}{4}\right)$ |
| | | | S-layer thickness $s_0$ | 80 nm |
| | P | 1 | P-layer material 1 | SiO$_2$ |
| | | | Material 1 refractive index $n_1$ | 1.46 (at 633 nm) |
| | | | P-layer phase 1 $n_1 \cdot p_1$ | $1 \left(\text{unit of } \frac{\lambda_M}{4}\right)$ |
| | | | P-layer thickness 1 $p_1$ | 108 nm |
| | | 2 | P-layer material 2 | SiN$_x$ |
| | | | Material 2 refractive index $n_2$ | 1.98 (at 633 nm) |
| | | | P-layer phase 2 $n_2 \cdot p_2$ | $1 \left(\text{unit of } \frac{\lambda_M}{4}\right)$ |
| | | | P-layer thickness 2 $p_2$ | 80 nm |
| | | | Number of period repetitions N | 3 |

The measurement substrate 1 described herein should not be confused with conventional light emitting structures such as semiconductors lasers or where a cavity effect is used in order to enhance the light and matter interaction inside of the cavity region. In these cases, the cavity region is typically made of material (bulk semiconductor, quantum wells, embedded quantum wells, etc.) displaying a sharp absorption line resonant with the resonance of the cavity. In these configurations, the light emission process or action takes place within or from inside the cavity region or layer. In view of this, the device or measurement substrate 1 of the present disclosure is quite counterintuitive.

Additionally, it is noted that when working with periodical mirrors, it can be convenient to choose the same structural parameters for the first and second mirrors 9, 11, in particular in terms of manufacturing. However, the specific tuning of the parameters (B, D, $\lambda_{M1}$, $\lambda_{M2}$, $\lambda_C$, $K_{M1}$, $K_{M2}$) of each mirror 9, 11 can be useful to seek for advanced performance.

Furthermore, when formed by a single layer, the cavity layer 7 can be significantly thicker than "lattice" layers used for the realisation of the mirrors 9, 11. The cavity layer 7 is necessarily embedded in between the two mirrors 9, 11.

It is possible to create a thick layer as the top-most layer or surface (of the top mirror 11 or located on or above the top mirror 11 and below the interfacing layer 15) in order to tune the surface electric field. In this case, the thicker layer has a thickness that does not constitute a cavity since no energy is stored within the layer and the presence of this thicker top-most layer does not introduce any recognisable, spectral feature that can be used for quality assessment. This tuning layer can, for example, have a thickness between 1 nm and 1 µm, or between 2 nm and 1 µm, or between 10 nm and 1 µm, or between 50 nm and 1 µm, or between 200 nm and 1 µm, or between 500 nm and 1 µm.

The luminescence measurement substrate 1 of the present disclosure permits to improve the performance of a luminescence measurement or analysis compared to the equivalent analysis when performed on a standard glass or polymer substrate. There can be different figures of merit for the performance improvement, for example, the signal-to-noise ratio or the time to photobleaching. In this context, the structure presented here, constituted of several layers and organised in a way that two mirrors and a cavity region are formed, present multiple major advantages over all the previous approaches, which are all based on a single mirror approach.

i The presence of a cavity layer in between the two mirrors generates an increase of the photonic bandgap width compared to an equivalent structure not having a cavity. This increase translates into greater performance.

ii The recognisable spectral feature (reflectivity dip) or features introduced by the presence of the cavity allows a sharper monitoring of the structure quality after fabrication.

iii It also enables a spectrometer free (thus faster and simpler) quality control method. A deviation from the nominal position of the reflectivity dip can be advantageously assessed using a transmittance measurement rather than a full spectrum measurement.

iv A selected fraction of the luminescence is allowed to propagate through the substrate and enable a directional collection on the other side of the substrate. This configuration enables a great simplification of the optical train of the measurement apparatus and allows miniaturized measurement.

A non-limiting further exemplary of the measurement substrate 1 is shown in FIG. 4. The device consists of a glass support 17, on top of which a multilayer coating 19 is deposited by means of plasma-enhanced chemical vapor deposition (PECVD). The multilayer coating 19 is composed of alternating amorphous silicon (aSi) and silicon oxide ($SiO_2$) layers. The bottom mirror 9 (M1) follows a S-type configuration and consists in a single amorphous silicon layer. The cavity layer 7 consists in a single thick silicon oxide layer. The top mirror 11 (M2) follows a T-type configuration and consists in a single pair of layers verifying a quarter-wave stack relationship. Finally, the device is covered with an epoxy-based chemical coating 15 to promote adhesion of proteins labelled, for example, with three distinct fluorescent markers 3: Alexa Fluor 488, Alexa Fluor 555 and Alexa Fluor 647.

For this exemplary structure, the main design criteria are the low number of layers which advantageously ensures a minimization of the manufacturing cost and the use of amorphous silicon as an inexpensive, abundant, well-established and high refractive index material.

Concerning the design parameters (presented below in Table 2), the two exemplary materials used for the manufacturing of this device are PECVD deposited amorphous silicon and silicon oxide. Based on the formalism provided in the general description of the device, the design of this structure can be summarized using the following structural parameters:

TABLE 2

Exemplary design parameters of an exemplary structure of a measurement substrate

| | Parameter | Symbol | Example value |
|---|---|---|---|
| Top mirror T | Design architecture | | T |
| | Design wavelength | $\lambda_M$ | 600 nm |
| | T-layer material 1 | | $SiO_2$ |
| | Material 1 refractive index | $n_1$ | 1.47 (at 600 nm) |

TABLE 2-continued

Exemplary design parameters of an exemplary structure of a measurement substrate

| | Parameter | Symbol | Example value |
|---|---|---|---|
| | T-layer phase 1 | $n_1 \cdot t_1$ | $1 \left( \text{unit of } \frac{\lambda_M}{4} \right)$ |
| | T-layer thickness 1 | $t_1$ | 102 nm |
| | T-layer material 2 | | Amorphous silicon (aSi) |
| | Material 2 refractive index | $n_2$ | 4.22 (at 600 nm) |
| | T-layer phase 2 | $n_2 \cdot t_2$ | $1 \left( \text{unit of } \frac{\lambda_M}{4} \right)$ |
| | T-layer thickness 2 | $t_2$ | 35 nm |
| Cavity C | Design wavelength | $\lambda_C$ | 900 nm |
| | Cavity layer material | | $SiO_2$ |
| | Cavity material refractive index | $n_C$ | 1.47 (at 600 nm) |
| | Cavity parameter | C | 1 |
| | Cavity layer phase | $n_C \cdot d_C$ | $1 \left( \text{unit of } \frac{\lambda_C}{2} \right)$ |
| | Cavity layer thickness | $d_C$ | 204 nm |
| Bottom mirror S | Design architecture | | S |
| | Design wavelength | $\lambda_M$ | 600 nm |
| | S-layer material | | Amorphous silicon |
| | Material refractive index | $n_S$ | 4.22 (at 600 nm) |
| | S-layer phase | $n_S \cdot s_0$ | $1 \left( \text{unit of } \frac{\lambda_M}{4} \right)$ |
| | S-layer thickness | $s_0$ | 35 nm |

An exemplary structure of the present disclosure has a typical theoretical reflectivity spectrum as shown in FIG. 5. The presence of a cavity leads to the existence of a dip (or a plurality of dips) in the reflectance spectrum at the cavity resonance wavelength(s). The presence of this feature or these features has several advantages including the possibility to more quickly and more easily assess the quality and accuracy of the device using spectroscopic or transmission measurement means. In comparison, an equivalent structure without any cavity possess a reflectivity spectrum that is rather smooth and relatively flat (FIG. 5, dashed curve) and free from easily or quickly identifiable features.

Figure 6:
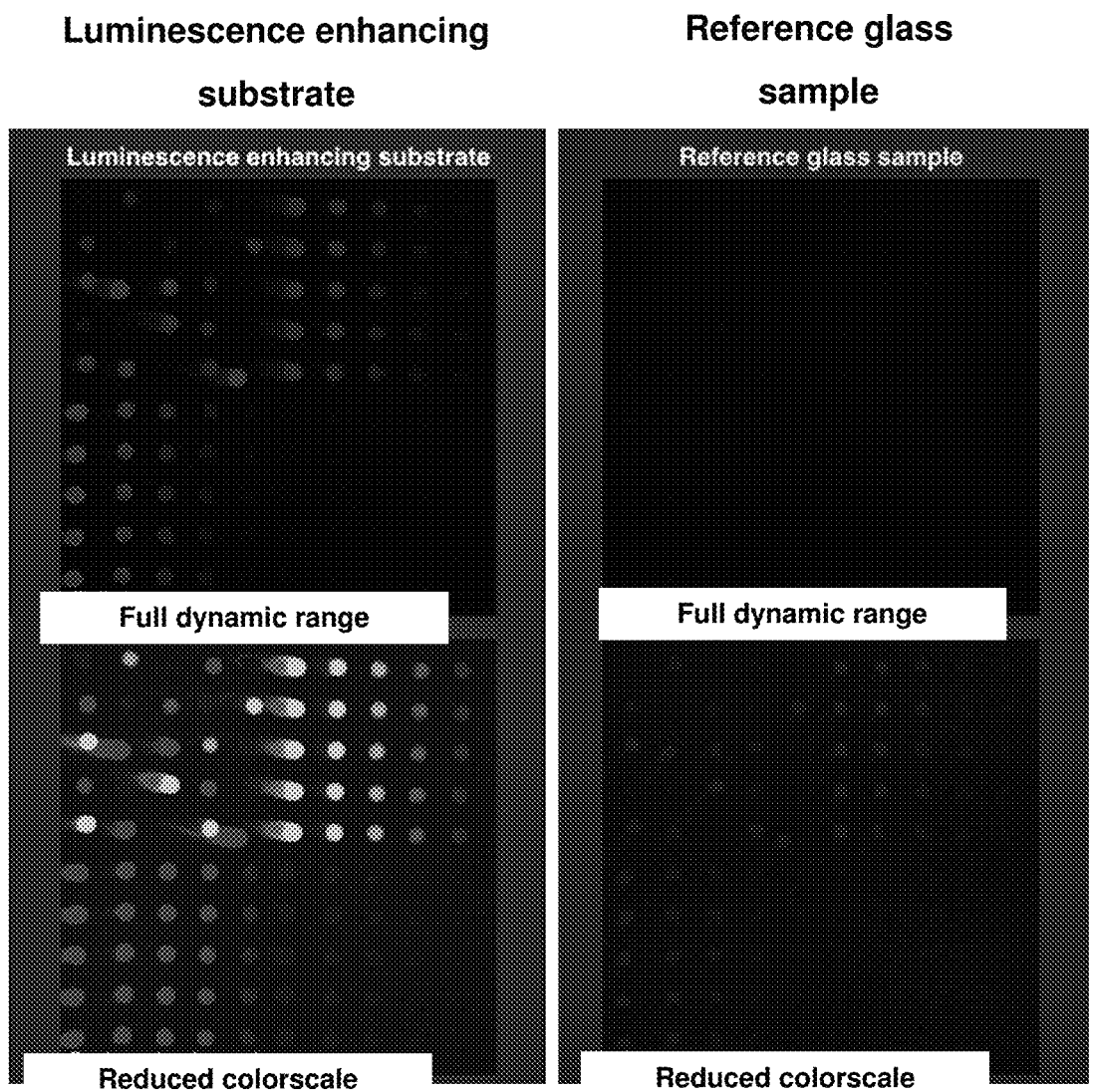
FIG. 6 shows experimental data demonstrating strong fluorescence enhancement schematic by an exemplary luminescence measurement substrate according to the present disclosure.

The structure of the present disclosure described above advantageously enables the detection of fluorescence compounds in much lower concentration than if the same experiment is performed on a regular glass slide (see FIG. 6). The fluorescence detection enhancement is demonstrated for three distinct fluorescent compounds (Alexa Fluor 488, Alexa Fluor 555 and Alexa Fluor 647) in FIG. 6.

The present disclosure also concerns a method for carrying out a sample emission measurement. The method includes providing the surface-based measurement substrate 1, attaching, to the measurement substrate 1, at least one or a plurality of entities 4 comprising at least one or a plurality of electromagnetic radiation emitting markers 3. Illumination of the measurement substrate 1 with excitation electromagnetic radiation to generate light emission from the at least one or plurality of electromagnetic radiation emitting markers 3 is then carried out. A measurement optical system or imaging system collects the emitted signals which are then processed by the system.

Figure 7A:
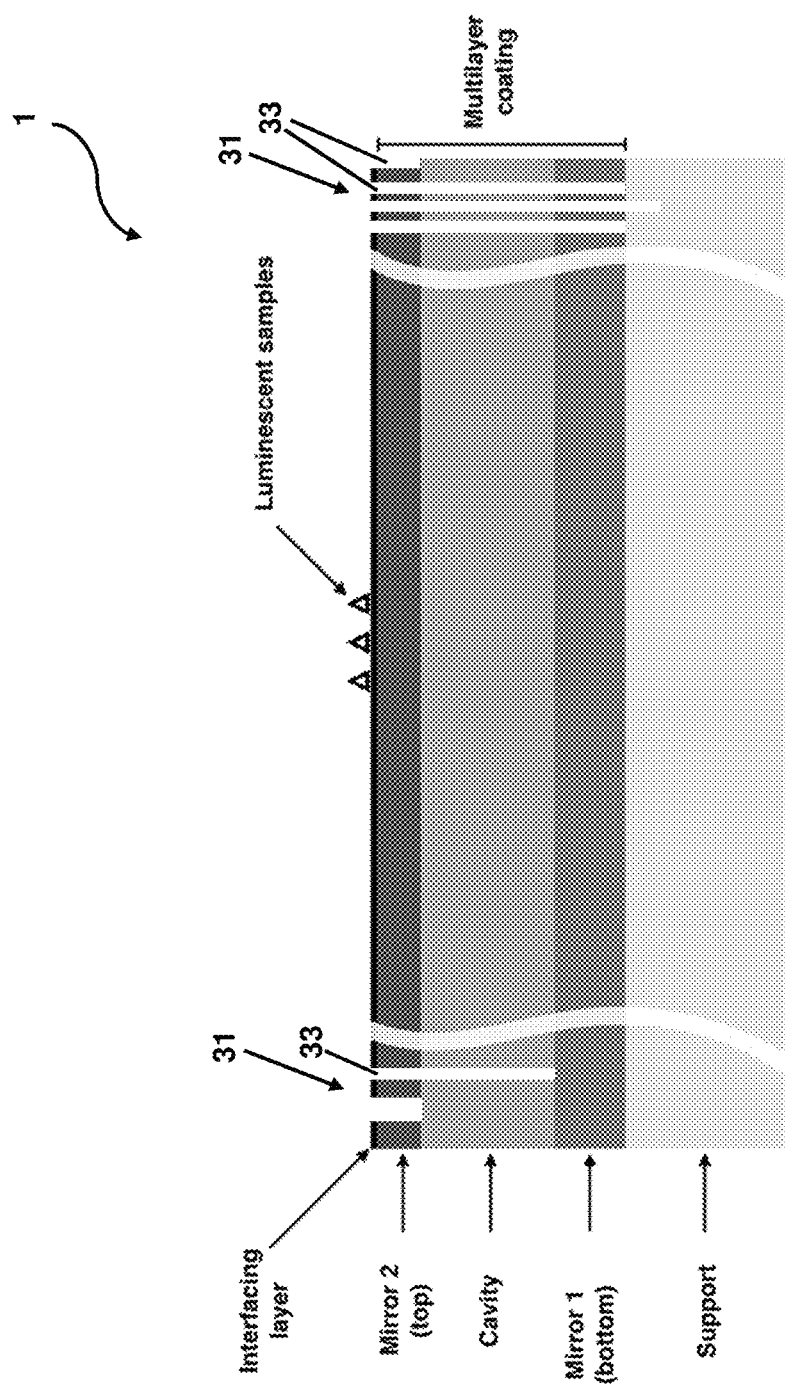
FIG. 7A is a schematic representation of another exemplary measurement substrate according to the present disclosure.

The measurement substrate 1 according to the present disclosure may further include at least one or a plurality of optical marks, engraving or imprints 31. The optical mark 31 comprises or consists of at least one or a plurality of trenches, depressions or indents 33, as for example shown in FIG. 7.

Figure 7B:
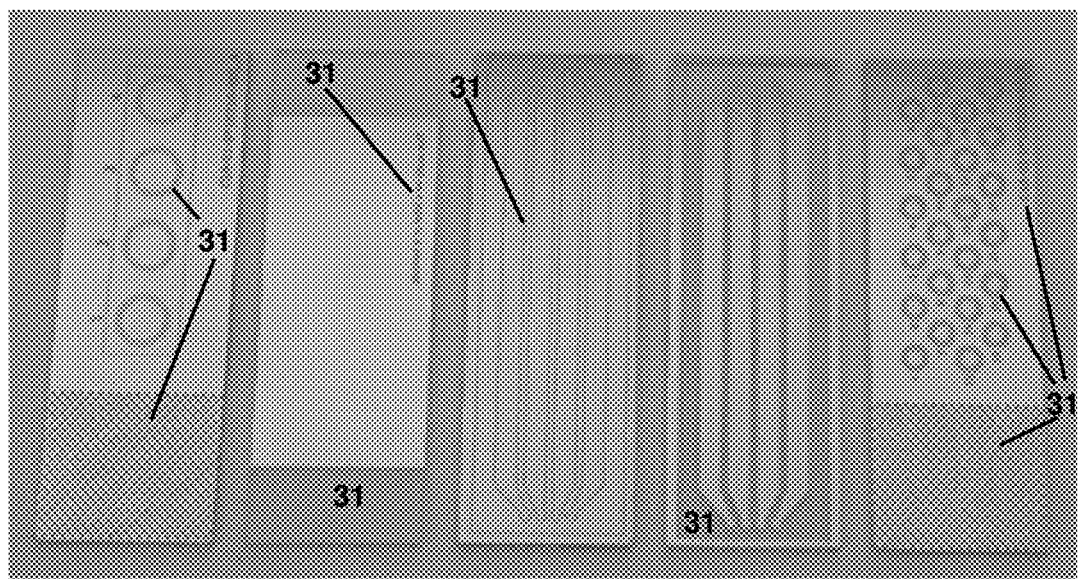
FIG. 7B is an image of exemplary measurement substrates according to the present disclosure.

The optical mark 31 extends, at least partially or fully, into the multilayer coating 19 and/or the interface layer or coating 15 and/or the support layer 17. The optical mark 31 may for example define a graphical representation, a shape, a pattern, a letter/number or a wording (or a plurality of these or any combination of these). Some exemplary optical marks 31 are shown in FIG. 7B.

The optical mark 31 may, for example, define alignment marks located on the substrate 1 to guide alignment with an associated device or instrument. The optical mark 31 may, for example, define a barcode.

The optical mark or marks 31 may be located at one or more corners of the substrate 1 or anywhere across the substrate 1.

The optical mark or marks 31 can be produced, for example, through material removal from the multilayer coating 19 and/or the interface layer or coating 15. This can, for example, be carried out by laser engraving, laser scribing or material cutting.

The optical mark or marks 31 assure the identification of the measurement side or surface of the measurement substrate 1 upon which the entity 4 is placed. The optical mark or marks 31 further assure that the measurement side is not damaged by inadvertent placement of the measurement side in contact with another surface.

Separating or filtering of the excitation radiation from the light emission radiation using one or more filters can also be carried out. Filtering of each of the marker emission signals can also be performed.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments and be given the broadest reasonable interpretation in accordance with the language of the appended claims. The features of any one of the above described embodiments may be included in any other embodiment described herein.

The invention claimed is:

1. Surface-based measurement substrate comprising:
at least one optical cavity layer;
a first optical mirror and a second optical mirror, the first and second optical mirrors enclosing the at least one optical cavity layer and at least partially defining an optical cavity, wherein the first optical mirror and the second optical mirror are attached and/or fixed to the at least one optical cavity layer to sandwich the at least one optical cavity layer between the first and second mirrors; and
an interface layer and/or interface coating provided on the first mirror and/or the second mirror, the interface layer and/or coating being configured to receive and/or hold at least one entity comprising at least one electromagnetic radiation emitting marker;
wherein the surface-based measurement substrate is configured for measurement of an electromagnetic radiation and/or signal emitted by and/or from at least one entity to be received and/or held on the surface-based measurement substrate, the at least one entity comprising the at least one electromagnetic radiation emitting marker configured to emit the electromagnetic radiation and/or signal when illuminated with excitation electromagnetic radiation having an excitation wavelength;
wherein the at least one optical cavity layer is an electromagnetic radiation emitting marker-free layer and/or the optical cavity is an electromagnetic radiation emitting marker-free optical cavity, and wherein the at least one optical cavity layer defines a closed substance into which electromagnetic radiation emitting markers cannot be inserted and the optical cavity is impermeable to electromagnetic radiation emitting markers; and
wherein the at least one optical cavity layer delimits a layer thickness defining at least one spectral feature and/or spectral dip in reflectance from the measurement substrate that is offset in wavelength from an emission wavelength of the at least one electromagnetic radiation emitting marker, wherein the at least one spectral feature and/or spectral dip in reflectance is indicated at a cavity resonance wavelength by an optical cavity resonance of the optical cavity, and the cavity resonance wavelength is offset in wavelength from the excitation wavelength of the excitation electromagnetic radiation that generates the electromagnetic radiation and/or signal from the at least one electromagnetic radiation emitting marker.

2. Measurement substrate according to claim 1, wherein the at least one optical cavity layer comprises or consists solely of a material or materials having an emission profile that is non-emitting at an emission wavelength peak and/or line of the at least one electromagnetic radiation emitting marker; and/or non-emitting at the cavity resonance wavelength.

3. Measurement substrate according to claim 1 including the at least one entity comprising the at least one electromagnetic radiation emitting marker.

4. Measurement substrate according to claim 3, wherein the at least one entity is located outside of the at least one optical cavity layer.

5. System comprising the measurement substrate according to claim 3, and further comprising the excitation electromagnetic radiation that generates the electromagnetic radiation or signal from the at least one electromagnetic radiation emitting marker or at least one excitation electromagnetic radiation source for providing the excitation electromagnetic radiation that generates the electromagnetic radiation or signal from the at least one electromagnetic radiation emitting marker.

6. Measurement substrate according to claim 1, wherein the at least one entity comprises a sample or biological sample to be investigated.

7. Measurement substrate according to claim 1, wherein the first and the second optical mirrors have a different central design wavelength.

8. Measurement substrate according to claim 1, wherein the at least one optical cavity layer has a thickness and refractive index value defining the resonance at the cavity resonance wavelength and said resonance is detuned or non-detuned relative to a central wavelength of the first and/or the second optical mirrors.

9. Measurement substrate according to claim 1, wherein each of the first and second mirrors comprise at least one layer, and wherein a thickness of the at least one optical cavity layer is greater than or less than a thickness of any one layer of the first and second mirrors.

10. Measurement substrate according to claim 1, wherein the at least one optical cavity layer comprises or consists solely of an arrangement of alternating layers having a resonance wavelength outside of a reflection band of the first and second mirrors.

11. Measurement substrate according to claim 1, further including a tuning layer configured to tune a surface electric field of the measurement substrate, the tuning layer being located between the interface layer or coating and the first mirror or the second mirror.

12. Measurement substrate according to claim 1, further including at least one or a plurality of optical marks or imprints located on the interface layer and/or coating.

13. Measurement substrate according to claim 12, wherein the at least one optical mark comprises or consists of at least one and/or a plurality of trenches, depressions and/or indents extending into one or more of: the first mirror, the second mirror, the at least one cavity layer and a support layer.

14. Measurement substrate according to claims 12, wherein the at least one optical mark defines at least one graphical representation, at least one shape, at least one pattern, at least one letter, at least one number, at least one wording or any combination of these.

15. Measurement substrate according to claims 12, wherein the at least one optical mark defines a barcode, or alignment marks configured to guide alignment of the measurement substrate with an associated device and/or instrument.

16. Measurement substrate according to claim 1, wherein the thickness of the at least one optical cavity layer defines at least two optical cavity resonance spectral features or spectral dips simultaneously generated in reflectance with at least one reflectance band defined between the at least two optical cavity resonance spectral features or spectral dips, each optical cavity resonance spectral feature or spectral dip defining a reflectance profile that decreases and then increases in value with increasing wavelength value.

17. Measurement substrate according to claim 1, wherein the at least one optical cavity layer comprises at least one materia having a light emission wavelength that is different to an emission peak wavelength of the electromagnetic radiation or signal of the at least one electromagnetic radiation emitting marker emitted when illuminated with excitation electromagnetic radiation having the excitation wavelength.

* * * * *